United States Patent Office 2,959,569
Patented Nov. 8, 1960

2,959,569
METHOD OF PREPARING ORGANOSILICON GRAFT POLYMERS

Earl L. Warrick, Pittsburgh, Pa., assignor to Dow Corning Corporation, Midland, Mich., a corporation of Michigan No Drawing. Filed July 5, 1956, Ser. No. 595,837

10 Claims. (Cl. 260—46.5)

This application is a continuation-in-part of the applicant's copending application Serial No. 505,561, filed May 2, 1955, which application is a continuation-in-part of application Serial No. 422,993, filed April 13, 1954, now abandoned.

This invention relates to a new and improved method of preparing organic-organosilicon graft polymers.

It is shown in my aforesaid application Serial No. 505,561 that the addition or grafting of an olefin to the alkyl radicals of an alkyl substituted organosilicon compound can be made to take place in the presence of a free radical generator such as an organic peroxide or certain azo compounds. It is illustrated in that application that an enhanced formation of the organic-organosilicon graft polymers is obtained by conducting the reaction in the presence of a finely divided inorganic solid such as MgO. The essence of the present invention lies in my discovery that finely divided inorganic solids, the particles of which have an average diameter of from 0.005 to 5 microns, have the unexpected and unusual ability to enhance the ease and extent of graft polymer formation, regardless of the nature of the free radical mechanism by which the reaction is effected.

Thus the present invention relates to an improvement in a process for producing graft polymers by contacting an organosilicon polymer which is essentially free of silicon bonded hydrogen atoms and which is essentially free of organic radicals having aliphatic unsaturation therein, with a non-silicic olefin in the presence of a free radical generator, which comprises conducting the reaction in the presence of a finely divided inorganic solid the particles of which have an average diameter of from 0.005 to 5 microns.

By the term "free radical generator" it is to be understood that I refer not only to chemical compounds capable of initiating free radical formation, such as the organic peroxides and azo compounds referred to in my aforesaid copending application, but to ionizing radiation as well. The term ionizing radiation, as used here and as well understood by the art, refers to beta rays, gamma rays, X-rays, and accelerated electrons, neutrons, protons, deuterons, and alpha particles. Convenient sources of such radiation are atomic piles or nuclear reactors, radioactive isotopes, electron or particle accelerators such as betatrons, cyclotrons, resonant transformers and linear accelerators, and X-ray equipment. A "Van de Graaff generator" has been found to be a convenient and practical source of such radiation.

As is known, a graft polymer generally consists of a "trunk" or "backbone" of one polymer or compound having attached thereto one or more side chains or branches consisting of a different monomer or low polymer. The "trunk" polymer is caused to have "active centers" by hydrogen abstraction brought about by the free radical generator, and an olefinic monomer or olefinic low polymer thus attaches at the "active center." Thus from a trunk polymer of "T" units and a monomer of "M" units, for example, one can obtain a graft polymer as

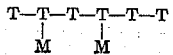

Or if the monomer is itself subject to polymerization, the graft polymer might take such a form as

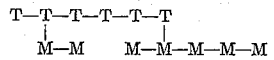

It is of course also possible for a cross linking effect to be achieved, thus:

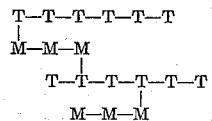

The latter effect may be desirable in some products, as where a gelled product is sought, and undesirable in others, as were a rubbery product is sought. The absence or extent of such cross-linkage can be controlled by the choice of reactants, choice of the type and/or amount of free radical generator employed, the use of "chain transfer agents," and general reaction conditions, e.g. temperature of reaction.

For convenience in differentiating the reactants hereinafter, those which form the "trunk" of the polymer are called trunk reactants, and the olefins which attach themselves to this trunk are referred to as "branch" reactants.

As has been noted above, it is thought that graft polymer formation comes about through a free radical mechanism. Accordingly, one can employ either ionizing radiation to bring about the formation of free radicals, or a chemical free radical generator. The preferred chemical free radical generators are organic peroxides, or azo compounds in which both of the N atoms of the azo linkage are attached to a tertiary carbon atom and the remaining valences of the teritary carbon atoms are satisfied by nitrile, carboxyalkyl, cycloalkylene, or alkyl radicals (preferably 1–18 carbon atoms), or radicals of the formula YOOC— in which Y is an alkyl radical (also preferably of 1–18 carbon atoms). Of course, any mixture of such "generators," or a combination of ionizing radiation and a chemical generator, can be employed if desired.

Operative peroxides include any organic compound containing the O—O linkage. These compounds may be considered as derivatives of hydrogen peroxide in which one or both of the hydrogen atoms has been replaced by an organic radical. Thus, the peroxides of this invention can be any compound of the formula ROOH (which are generally known as hydroperoxides or as peroxy acids depending upon the nature of the R group) and any compound of the formula ROOR in which R is an organic radical. These compounds are generally known as diorganoperoxides.

Specific examples of peroxides which are operative in this invention are hydroperoxides such as methyl hydroperoxide, t-butyl hydroperoxide, trans-decalin hydroperoxide, 1-methyl cyclopentyl hydroperoxide, 3-methyl-3-hydroperoxy-1-butyne, 2-cyclohexen-1-yl hydroperoxide, cumene hydroperoxide, tetralin hydroperoxide, triphenylmethyl hydroperoxide, benzyl hydroperoxide, p-nitrophenyldiphenylmethyl hydroperoxide, d-hydroperoxy tetrahydrofuran and d-hydroperoxyethyl ethylether; peroxy acids such as peroxyacetic acid, peroxyisovaleric acid, peroxycrotonic acid, peroxytrichloroacetic acid, peroxylactic acid, peroxybenzoic acid, monoperoxyphthalic acid, diperoxyphthalic acid, peroxycinnamic acid, p-methoxyperoxybenzoic acid, m-nitroperoxybenzoic acid, and 2,4-dichloroperoxybenzoic acid; diorganoperoxides such as di-tertiary-butyl peroxide, diethyl peroxide, tertiary-butyl methyl peroxide, di-triphenylmethyl peroxide, ascaridole, 1,4-epydioxy-p-menthane, 1,4,2,3-diepoxy-p-menthane, benzoyl peroxide, t-butylperbenzoate, benzoyl acetyl peroxide, monochlorobenzoyl peroxide, 2,4-dichlorobenzoyl peroxide, diacetyl peroxide, dialkyl peroxy dicarbonates of the formula ROOCOOCOOR in which R is methyl, ethyl, phenyl or tolyl; ethyl peroxyacetate, t-butyl peroxybenzoate, di-t-butyl diperoxyphthalate, bis-(1-hydroxycyclohexyl)peroxide, 1-hydroxy-1'-hydroperoxycyclohexyl peroxide, bis(hydroperoxycyclohexyl)peroxide, trimeric cyclohexanone peroxide, bis(hydroxyethyl)peroxide, bis(phenylhydroxymethyl)peroxide, trimeric acetone peroxide, methylhydroxymethyl peroxide and (Me₃COO)₂CMe₂.

The azo compounds which are operative in this invention are those containing tertiary carbon atoms (that is, carbon atoms having no hydrogen attached thereto) attached to each nitrogen atom of the azo linkage. The remaining valences of the tertiary carbon are satisfied by nitrile radicals, carboxyalkyl radicals, cycloalkylene radicals, alkyl radicals and radicals of the formula YOOC— in which Y is an alkyl radical. Specific examples of such azo compounds are Me₂(NC)CN=NC(CN)Me₂,

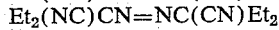
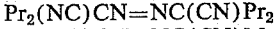
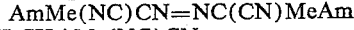
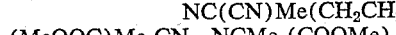
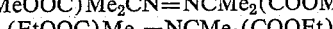

and

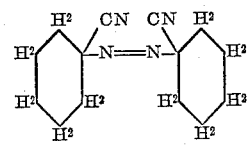

The symbols Me, Et, Pr, Am, and Ph have been used above and throughout this specification to represent methyl, ethyl, propyl, amyl, and phenyl respectively.

Any organosilicon polymer can be used as the "trunk" polymer or reactant in this invention, because apparently any such polymer is capable of producing some free radicals (in the sense that hydrogen is abstracted and "active centers" are produced) under the proper conditions. Since the object of this invention lies in the production of graft polymers, however, the trunk polymer should be one which is capable of producing a substantial and recognizable "amount" of free radicals, and it should be substantially free of any tendency to undergo further polymerization (other than graft polymerization) under the conditions employed. Thus the trunk polymer should be one which is substantially free of any aliphatic unsaturation. Of course, a low degree of any such unsaturation does not preclude the desired reaction, it merely sets up a competitive reaction which is usually preferably avoided.

The organosilicon "trunk" compounds employed herein should also be substantially free of silicon bonded hydrogen atoms, to avoid competing addition reactions. This is particularly true where a chemical free radical generator, such as an organic peroxide, is employed. The remaining valences of the silicon atom can be satisfied with any other known type of atom or group.

By "substantially free" of silicon bonded hydrogen atoms, or aliphatic unsaturation, it is to be understood that the traces of these undesirable constituents which are often present in commercially available organosilicon compounds are by no means objectionable. Such trace amounts have little effect on the reaction. There is no particular maximum amount of these impurities above which the invention completely fails to operate, for the problem is purely one of competing reactions. However it is generally advisable to use organosilicon trunk reactants containing less than one silicon bonded hydrogen or unsaturated aliphatic radical for every ten silicon atoms, preferably less than 1 per 100 Si atoms.

It is to be understood that the organosilicon trunk reactant can be a polymer or a copolymer. Because lower alkyl radicals attached to silicon are much more amenable to free radical or "active menter" formation than other radicals, it is preferred that this reactant contain at least one alkyl radical of less than 5 carbon atoms attached directly to silicon per molecule. Thus hexamethyldisiloxane, bis(trimethylsilyl)benzene, pentaphenylmethyldisiloxane, dimethylpolysiloxane, ethylphenylpolysiloxane, hexamethyldisilane, and copolymers of dipenylsiloxane and dimethylsiloxane are illustrative of the preferred reactants.

The types of compounds which are preferred herein are organopolysiloxanes of the general formula

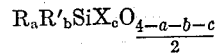

organosilcarbanes of the general formula

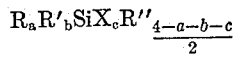

and organopolysilanes of the general formula $R_aR'_bX_cSi$— (in which the Si is attached directly to another Si atom). In these compounds $a$ has a value from 1 to 3, $b$ has a value from 0 to 2, and $c$ has a value from 0 to 2. The sum of $a+b+c$ has a value not greater than 3. The subscripts can have fractional average values when a mixture of polymers or a polymer containing a mixture of different polymeric units is employed. R is an alkyl radical of less than 5 carbon atoms such as for example methyl, ethyl, propyl, isopropyl and butyl. R' is any organic radical attached to the silicon by a silicon carbon bond, which radical is free of aliphatic unsaturation, as for example higher alkyl radicals such as hexyl and octadecyl; cycloalkyl radicals such as cyclohexyl and cyclopentyl; aryl hydrocarbon radicals such as phenyl, tolyl and xenyl; halogenated hydrocarbon radicals such as chlorocyclohexyl, chlorooctadecyl, pentafluoroethyl, heptafluoropropyl, chlorophenyl, bromophenyl, chloroxenyl, and trifluorotolyl; and organofunctional radicals such as carboxyphenyl, gamma-hydroxypropyl, gamma-aminopropyl and any other hydrocarbon radical having aldehyde, ketone, nitrile, nitro, carboxyl, amide, hydrosulphide or other functional groups attached thereto.

R'' is any divalent hydrocarbon radical which is free of aliphatic unsaturation such as methylene, ethylene, propylene, phenylene, xenylene or cyclohexylene radicals. X is any hydrolyzable or condensable group such as hydroxyl, amino, sulphide, halogen, or OR''' groups where R''' is a monovalent hydrocarbon radical free of aliphatic unsaturation such as methyl, ethyl, octadecyl, cyclohexyl, phenyl, tolyl, benzyl and naphthyl.

The polymers can also contain both siloxane and silcarbane linkages, such as those in U.S. Patent 2,511,056; or siloxane and polysilane linkages such as those in U.S. Patent 2,672,105; or polysilane and silcarbane linkages such as those in U.S. Patent 2,563,004.

Thus it can be seen that for the purpose of this invention the organosilicon trunk reactants can be in the form of partially hydrolyzed silanes containing residual hydrolyzable groups; silazanes such as hexamethylcyclotrisilazane and dimethyltetraphenyldisilazane; silcarbanes; polysilanes; silanols; salts of silanols and both partially condensed and completely condensed polysiloxanes. Preferred examples of the latter include hexamethyldisiloxane, cyclic siloxanes such as octamethylcyclotetrasiloxane, dimethylpolysiloxane gums, copolymeric gums of dimethylsiloxane and phenylmethyl- or diphenylsiloxane units, and trimethylsiloxy endblocked polymers of dimethylsiloxane (or dimethylsiloxanephenylmethylsiloxane) in viscosities of from 1 to 1,000,000 cs. at 25° C. Examples of the partially condensed polysiloxanes which can be used are the well known silicone resins, e.g. polymers and copolymers of methyl substituted, phenyl substituted, ethyl substituted, or unsubstituted siloxane units in which the average degree of substitution ranges from about 0.5 to about 1.8 organic radicals per silicon atom. Such resins retain uncondensed Si bonded OH groups until completely "cured."

Any non-silicic olefinic compound, i.e. any non-silicic compound containing aliphatic C=C linkage, can be used herein to graft to the "trunk" compounds. The requirement for aliphatic C=C linkage means that there must be an ethylenic linkage in an aliphatic portion of the molecule. The term "aliphatic" is used here in its broad sense as inclusive of cycloaliphatic, as will be obvious from the illustrative non-silicic reactants described below. The compound can be either monomeric or polymeric (including copolymeric) in nature, and can contain more than one ethylenic linkage per molecule. For practical results any polymeric olefin employed should have substantial residual unsaturation (such as polymers of butadient, chloroprene, isoprene, etc.). By substantial residual unsaturation it is meant that the polymer should be capable of sufficient grafting to the trunk compound to have a noticeable effect thereon. Preferably the olefinic reactant used contains at least one ethylenic linkage for every 50 carbon atoms present. By "non-silicic" it is meant that the olefin should not contain silicon. In other words, a vinylsilane or siloxane type of compound is not within the scope of the olefinic reactants used herein.

Specific olefinic "branch" reactants which can be employed herein are hydrocarbon olefins such as ethylene, butadiene, cyclohexene, styrene, vinyltoluene, divinylbenzene, indene, isoprene and hexadecene; halogenated olefins such as tetrafluoroethylene, vinylchloride, allylchloride, trifluorochloroethylene, hexafluorobutadiene, vinylidene chloride, dichloroethylene and chlorocyclohexene; unsaturated aldehydes such as crotonaldehyde, acrylic aldehyde and cinnamic aldehyde; unsaturated alcohols such as allyl alcohol, cyclohexenol, 4-methylpenten-3-ol-1, cinnamic alcohol and penten-4-ol-2, unsaturated acids such as acrylic acid, methacrylic acid, crotonic acid, vinylacetic acid, cinnamic acid, maleic acid and its equivalent maleic anhydride, dimethylmaleic acid, lauroleic acid, oleic acid, linoleic acid, and linolenic acid; unsaturated ethers such as diallyl ether and allylethyl ether; unsaturated esters such as methylacrylate, methylmethacrylate, vinylacetate, and allylacetate; unsaturated amides such as crotonamide, acrylamide and cinnamamide; unsaturated nitriles such as acrylonitrile, methacrylonitrile, and cinnamonitrile; unsaturated mercaptans such as allylmercaptan; unsaturated amines such as allylamine, allylethylamine and vinyldimethylamine; unsaturated sulphides such as allyl sulphide and vinyl sulphide; unsaturated ketones such as methylvinyl ketone, allyl acetone, and benzalacetophenone; unsaturated isocyanates such as allyl isocyanate and cinnamyl isocyanate; and compounds containing combinations of the above type functional groups.

It has been found that whereas any of the above olefinic compounds are operative in this invention, in general the best yields are obtained with those which are free of active hydrogen, i.e. hydrogen which is attached directly to oxygen, nitrogen or sulphur atoms. This is only a generality, however, and rather good yields of graft polymers have been obtained with compounds such as acrylic acid, allyl amine, allyl alcohol, and acrylamide.

Not only are the above monomeric olefins operative herein but also polymeric olefins having substantial C=C residual unsaturation. Thus, polybutadiene, natural gum rubber, polychloroprene, copolymers of butadiene and styrene, copolymers of butadiene and acrylonitrile, polyhexafluorobutadiene and similar compounds can be employed as branch reactants in this invention.

The most preferred olefinic branch reactants are substituted olefins. The term "substituted" olefin as used here means that the olefinic reactant contains, in addition to the ethylenic linkage, at least one aromatic hydrocarbon radical or at least one of any atom other than carbon and hydrogen, as for example oxygen, nitrogen, sulfur, halogen, or phosphorus. In other words, a "substituted" olefin excludes a mere aliphatic hydrocarbon containing ethylenic linkages. Thus the most preferred olefinic reactants are not really olefins per se in the narrowest sense of the word, for they can be any sort of a non-silicic compound containing ethylenic (C=C) linkages in an aliphatic portion of the molecule. The "substitution" may thus overshadow the olefinic nature of the compound insofar as the usual rules of nomenclature are concerned. Here, however, I prefer to stress the olefinic nature of the branch reactant because it is the olefinic portion of the reactant which is necessary to the desired grafting reaction.

From the illustrative reactants described above, it will be seen that the preferred olefinic compounds can be defined as being selected from the group consisting of (1) olefinic hydrocarbons, (2) halogenated olefinic hydrocarbons, (3) alkenyl alcohols, (4) alkenyl amines, (5) alkenyl nitriles, (6) alkenyl amides, (7) ethylenically unsaturated mono- and dicarboxylic acids, (8) alkenyl esters of saturated mono- and dicarboxylic acids, and (9) alkyl esters of ethylenically unsaturated mono- and dicarboxylic acids, the compounds of (7), (8) and (9) each consisting of carbon, hydrogen and carboxylic oxygen atoms.

The ratio of olefinic "branch reactant" to organosilicon "trunk reactant" can vary over an almost unlimited range. The extremities of this range are chiefly controlled only by the obvious practical considerations. Thus the minimum amount of olefin employed is preferably greater than 5 percent by weight based on the weight of the organosilicon reactant, for below this the degree of graft polymerization obtained does not usually alter the properties of the organosilicon polymer to the desired extent. The maximum amount used varies with the extent of grafting desired and the particular choice of olefin and free radical source. Obviously if the olefin has much of a tendency to polymerize with itself under the conditions used, any excess present tends to form the olefinic polymer rather than the graft polymer, thus decreasing the efficiency of the process.

With the proper choice of olefin and reaction conditions, any conceivable excess of olefin (e.g. 2,000 percent or more based on the weight of the organosilicon polymer) can be used. An example of using such an excess would be where a rubbery organosilicon polymer is immersed in a bath of the olefin and the whole mass is subjected to ionizing radiation (or to the action of a chemical free radical generator) insufficient to cause any substantial self-polymerization of the olefin. An organosilicon polymer in a rubbery or gelled state can also be "swelled" by immersion in the olefin, and the swollen gel subjected to the chosen process. In the latter case if a chemical free radical generator is used, it can be incorporated in the olefin so that it is present within the swollen structure of the gel. The defined inorganic solid can be suspended in the olefin if either the bath or swelling technique is used, or it can be e.g. milled into either a swollen polymer or a polymer-olefin mixture. When the organosilicon polymer is a liquid, the olefin and solid can be dispersed therein (or vice-versa) by any suitable means of agitation, along with a chemical free radical generator if such is to be used.

Regardless of the particular technique employed to bring about the contact of organosilicon polymer, olefin, and inorganic solid, ordinarily it will be best to use an amount of the olefin sufficient to provide from 1 to 20 ethylenic linkages for every 10 Si atoms in the organosilicon reactant.

Any inorganic solid which can be obtained within the defined limits of particle size is suitable for use in the process of this invention. As noted previously, the particles should have an average diameter of from 0.005 to 5 microns. Such particles have a surface area of from 0.5 to 1 M² per gram (depending on their density) as a minimum, ranging up to 500 to 1,000 M² per gram as a maximum. The smaller particles (i.e. those having the largest surface area per gram) are generally preferable. Particles with even smaller diameters than the indicated minimum could be used if they were available to any practical extent. The chosen material should of course be chemically inert to the reactants in a particular system.

The most preferred solids fall within three general classes: simple ionic crystals; complex silicates; and amorphous solids.

The amorphous solids are best represented by materials such as the silica gels (in a variety of forms distinguished by the method of their preparation, known to the trade as e.g. xerogels, aerogels, and fume silica), silica-alumina gels, and other "mixed" gels of silica with various other metal oxides.

The suitable complex silicates include a variety of minerals such as cyanite ($Al_2SiO_5$), beryl $$3(BeO.Al_2O_3.6SiO_2)$$

the various garnets, phlogopite (also known as magnesium mica), phenacite ($2BeO.SiO_2$), olivine [$(Mg,Fe)_2SiO_4$], muscovite ($K_2O.3Al_2O_3.6SiO_2.2H_2O$), topaz $$[(AlF)_2SiO_4]$$

and zircon ($ZrSiO_4$).

The most suitable ionic crystals fall within the following types, having the indicated range of interionic distances:

| Type: | Interionic distance A. |
|---|---|
| 1. $M^+X^-$ | 1.96 to 3.82 |
| 2. $M^+_2X^{--}$ | 2.0 to 3.54 |
| 3. $M^{++}X^{--}$ | 2.0 to 3.50 |
| 4. $M^{++}X_2^-$ | 2.01 to 3.01 |

The first type above is exemplified by the fluorides, chlorides, bromides, and iodides of Li, Na, K, Cs, and Rb. The oxides, selenides, sulfides and tellurides of K, Na, and Li are illustrative of type 2, and the same derivatives of Mg, Ca, Sr, and Ba are within type 3. Type 4 includes all of the halides of Ba, Cd, Sr, Mg, and Zn. (See "Nature of the Chemical Bond" by Linus Pauling, 2d Edition, pp. 352–365.)

The amount of finely divided solid which can be employed is largely dependent upon the particle size of the material. For example, it is not practical to incorporate any more than about 15 parts by weight per 100 parts of the organosilicon polymer if a silica is used which has particles with an average diameter of 0.005 micron, for such a material has a tremendous capacity to "fill" the polymer and efficient wetting is not obtained at higher levels. In comparison, however, if a silica is used which has an average particle size of 5 microns, as much as 100 parts by weight per 100 parts of the polymer can be incorporated. Of course greater amounts of either can be used if the olefin is present at the time the solid is dispersed. Ordinarily from about 1 to about 35 parts by weight of the solid per 100 parts of the organosilicon polymer is preferred.

If a chemical free radical generator is employed, any amount capable of producing a perceptible degree of grafting is suitable. There is no particular maximum amount except for that dictated by economy, unless the olefin used is susceptible to self polymerization in the presence of the agent employed. It is also self-evident the greater amounts of a chemical agent can be used when that particular agent does not bring about cross-linkage in the organosilicon polymer. Ordinarily any chemical free radical generator employed will be used in an amount of from 0.1 to 20 percent by weight based upon the weight of the organosilicon polymer, with the best results usually obtained by using an amount in the neighborhood of 3 to 10 percent by weight.

When ionizing radiation is employed as the free radical generator, the "dose" or energy which must be used varies not only with the reactants which are present but with the depth of material to be treated and the time which one can devote to the activation of any particular quantity. Thus the optimum conditions for each system must be experimentally determined. In general it can be said that except for very high level energy electrons or protons, the penetration of these particles is less than that of neutrons or gamma rays. On the other hand, however, in comparing the effects of various forms of radiation of equal energy, the effect per unit volume of material is greater for the electrons or protons. In other words, the ionization effect tends to be concentrated on the surface when protons, electrons, alpha particles or fission fragments are the source of energy, but is distributed through a larger volume of material when neutrons or gamma rays are the source. Thus the type of radiation employed must be chosen not only from the standpoint of economics and availability, but in view of the desired results as well. Considering all aspects of the matter, at the present time the "Van de Graaff generator" seems to be the best source of radiation in the process of this invention. A typical model of this generator provides a 2 m.e.v. electron beam over an area of about 15 cm.².

A convenient unit for designating the amount of radiation energy employed is the mrep. (megarep.). A "rep." (roentgen equivalent physical) is the amount of radiation energy required to produce an absorption of 83.8 ergs in one gram of water. Most high polymers are very similar to water in their radiation absorption characteristics, so the rep. unit is commonly used in this field. The 2 m.e.v. Van de Graaff generator mentioned above provides about $4\times10^6$ rep. per second, or about $1.4\times10^{10}$ rep. per hour. As an indication of the "strength" of the mrep., it has been found that the vulcanization of a dimethylpolysiloxane rubber or bringing about noticeable cross-linkage in polyethylene both require about 5 megareps. In the present invention, radiation of at least 0.1 mrep. is generally employed, and ordinarily from 2 to 4 mreps. is preferable. In general, higher amounts of radiation produce more grafting sites and thus lead to a greater degree of graft polymerization. However some olefins are much more susceptible to self polymerization from radiation than others (e.g. methyl methacrylate is roughly 20 times as sensitive as styrene). Since such polymerization is usually not desired where grafting is the objective, the dosage of radiation is controlled accordingly. When a sensitive olefin is employed it obviously becomes a matter of individual choice as to whether a high degree of grafting is worth sacrificing some of the olefin to the by-production of the olefinic polymer.

The temperature at which the reaction of this invention is conducted depends upon all of the many variables involved. Radiation grafting is generally effective with no external application of heat. It tends to proceed at a faster pace at elevated temperatures, but at the same time higher temperatures tend to promote cross-linkage and olefinic polymerization so it may be desirable to cool the reactants. On the other hand, higher temperatures may be desirable to soften a high polymer or increase its solubility, etc., so that better contact is obtained between all of the reactants. When an organic peroxide or the defined azo compounds are used as the free radical generator, it is generally desirable to operate in the region of 50 to 150° C., and it is preferable to exclude oxygen from the system. Either reaction can be carried out at atmospheric, subatmospheric, or superatmoshperic pressures.

If desired, the reaction can be carried out in a relatively inert mutual solvent for the organosilicon polymer and the olefin, or in a solvent for either reactant with the other reactant and the solid suspended therein. Saturated aliphatic hydrocarbons or aromatic hydrocarbons are comparatively inert even in the radiated system, and are preferred as solvents for that reason. The use of such a solvent tends to favor a shorter grafted branch in the final product. The so-called "chain transfer agents" can also be incorporated, either as "solvents" themselves or as additional reactants. These agents are exemplified by such compounds as $CCl_4$, bromoform, chloroform, and the mercaptans, and are well known in the art of organic grafting. The chain transfer agents act as "end-blocking" units on the grafted chains, hence they too provide a product with a shorter grafted branch.

The products of this invention can be separated from by-products or excess reactants in the system by any suitable means, as for example by distillation, solvent extraction, or selective solvent fractionation. When the proper reactant ratios and reaction conditions are employed, any separation of product may be entirely unnecessary.

The products of this invention are useful as lubricants, surfactants, hydraulic fluids, electrical insulation, and for other uses for which organosilicon compounds have become widely known. The physical, mechanical, and chemical properties of the original polymer can be modified by the grafting process. Increased lubricity, lower freezing points, increased thermal stability and stabilization toward hydrolysis have been achieved by grafting chlorotrifluoroethylene onto various silicone fluids. At low levels of grafting, silicones have been made more soluble in a wider range of organic solvents. Conversely, high level grafting has made silicone rubber more solvent resistant. Grafting of olefinic alcohols, acids, amines, and amides to silicones brings about changes in compatibility and solubility of the polymer, and gives products of interest as emulsifiers and surfactants.

Particular benefits of this invention lie in the use of the radiation grafting technique. Many olefins are highly impractical as grafting reactants in a chemical free radical generator system because their tendency toward self polymerization is too great. With many of such olefins, irradiation is the only practical manner of obtaining a desired degree of grafting. This is particularly true of aromatic or highly resonant types of olefins, which seem to be capable of absorbing radiation energy in resonant states rather than in the formation of an activated radical which would lead to self polymerization.

Although the degree of crystallinity of organic high polymers is decreased by irradiation, it appears that irradiation of an organosilicon polymer in the presence of an olefin and the finely divided inorganic solids presents a method of preparing isotactic grafts, i.e., grafted units of a highly crystalline structure. This is highly desirable in that it affords a means of increasing the moderate temperature tensile strength of silicone rubber.

The following examples are illustrative only, and are not to be construed as limiting the invention.

Example 1

A mixture of 403 g. of a trimethylsiloxy end-blocked dimethylpolysiloxane fluid having a viscosity of 10 cs. at 25° C., 118 g. $CF_2=CFCl$, 12 g. benzoyl peroxide, and 10 g. of MgO having a particle size of less than 5 microns was heated and agitated in a rocker bomb at 150° C. for 17 hours. The recovery of 31 g. of unreacted $CF_2=CFCl$ from the cooled bomb showed that 73.7 percent of the loaded material had reacted. The product was a fluid having a viscosity of about 11 cs. at 25° C., and an analysis showed that it contained 17.32 percent by weight of the $CF_2CFCl$ units grafted onto the methyl silicone through its methyl radicals. As a comparison, a comparable run was made omitted the MgO. The resulting fluid product showed only 11.25 percent of $CF_2CFCl$ units present.

Example 2

210 g. of trifluorochloroethylene, 360 g. of a 1,000 cs. trimethyl end-blocked dimethylpolysiloxane, 5 g. of di-t-butyl peroxide and 2 g. of MgO were heated in an atmosphere of nitrogen in an autoclave at a temperature of 131° C. for about 17 hours. The reaction product was a gel containing 29 percent grafted trifluorochloroethylene. This product was separated by extraction with toluene and there was obtained a soluble fluid containing 27 percent by weight grafted trifluorochloroethylene.

Example 3

408 g. of the siloxane of Example 2, 189 g. of trifluorochloroethylene, 5 g. of t-butyl hydroperoxide and 2 g. of MgO were heated under nitrogen in an autoclave at 139° C. for 16.5 hours. The product was a grease-like material which was found to contain 24.2 percent by weight grafted trifluorochloroethylene.

Example 4

334 g. of the siloxane of Example 2, 192 g. of trifluorochloroethylene, 6.5 g. of dilauroyl peroxide and 2 g. of MgO were heated in an autoclave 17 hours at 111° C. After removing the unreacted materials 410 g. of an oily product containing 13.4 percent by weight grafted trifluorochloroethylene was obtained.

Example 5

307 g. of the siloxane of Example 2, 5 g. of succinic acid peroxide, 219 g. of trifluorochloroethylene and 2 g. of MgO were heated 18.5 hours at 112° C. in an autoclave. The resulting product was centrifuged and there was obtained 322 g. of an oil containing 10.5 percent by weight grafted trifluorochloroethylene.

Example 6

374 g. of the siloxane of Example 2, 170 g. of trifluorochloroethylene, 4 g. of perbenzoic acid and 2 g. of MgO were heated in an autoclave 16 hours at 97° C. The product was 361 g. of an oil containing 7.2 percent by weight grafted trifluorochloroethylene.

Example 7

313 g. of the siloxane of Example 2, 200 g. of trifluorochloroethylene, 7 g. of cumene hydroperoxide and 2 g. of MgO were heated in an autoclave 17 hours at 113° C. The product amounted to 309 g. of an oil containing 2.4 percent by weight grafted chlorotrifluoroethylene.

Example 8

Good yields of graft polymers are obtained by heating the siloxane of Example 2 with the olefins indicated below, when 5 percent by weight (based on the weight of the siloxane) of a silica having an average particle size of about .01 micron is suspended in the reaction mixture. The type of free radical generator used, amounts of each reactant, and time and temperature of reaction are shown in the table below.

| Grams Olefin | Grams Siloxane | Grams Catalyst | Time, Hrs. | Temp., ° C. |
|---|---|---|---|---|
| 52 styrene | 298 | 4 benzoyl peroxide | 1.5 | 100 |
| 6 divinylbenzene | 100 | 1 t-butylperbenzoate | 1.5 | 150 |
| 48 vinyl acetate | 304.5 | 3 benzoyl peroxide | 3.5 | 120 |
| 52 acrylonitrile | 157 | 3 benzoyl peroxide | 3 | [1] 70 |
| 50 acrylamide | 150 | 4 benzoyl peroxide | 1 | 55 |
| 82 cis-dichloroethylene in 50 g. toluene. | 200 | 10 benzoyl peroxide | 3 | [1] 25-85 |
| 52 $F_6Cl_2$cyclopentene | 306 | 3 benzoyl peroxide | 2.5 | 110 |
| 82 allyl alcohol | 200 | 10 benzoyl peroxide | 3 | 85 |
| 82 allyl amine | 200 | 10 benzoyl peroxide | 3 | 85 |
| 82 acrylic acid | 200 | 10 benzoyl peroxide | 3 | 85 |
| 178 trifluorochloroethylene. | 313 | 5 NCCN=NCCN $\mid$ $\mid$ Me₂ Me₂ | 15 | 110 |

[1] The reactants were heated under nitrogen.

Example 9

When the olefins listed in Example 8 are reacted, under the conditions illustrated in that example, with hexamethyldisiloxane, octamethylcyclotetrasiloxane, hexamethylcyclotrisilazane, methylene linked polymers of the type $Me_3Si(CH_2SiMe_2)_nCH_2SiMe_3$, polymers of the type $Me_3SiO(MePhSiO)_nSiMe_3$, or benzene soluble copolymeric gums containing 90 mol percent $Me_2SiO$ units and 10 mol percent $PhMeSiO$ units, the comparable graft polymers are obtained.

Example 10

A high polymer dimethylpolysiloxane gum which was relatively free of cross-linkage (as shown by its solubility in benzene) was compounded into seven different mixtures, as follows:

A. 100 g. gum, 20 g. indene, 3 g. silica having an average particle diameter of 0.012 micron.
B. 100 g. gum, 20 g. indene, 3 g. MgO having an average particle diameter of about 0.15 micron.
C. 100 g. gum, 20 g. indene, 3 g. KCl having an average particle diameter of about 0.2 micron.
D. 100 g. gum, 20 g. styrene, 3 g. silica of A.
E. 100 g. gum, 20 g. styrene, 3 g. MgO of B.
F. 100 g. gum, 20 g. styrene, 3 g. KCl of C.
G. 100 g. gum, 20 g. styrene.

Each of these mixtures was thoroughly blended on a mill, and then placed in metal containers so that the depth of each was one-fourth inch. Each mixture was then exposed to a dose of 4 mrep. under a 2 m.e.v. Van de Graaff generator, the exposure being made at room temperature. Each sample was then individually devolatilized at a pressure of less than 1 mm. Hg for about 100 hours. The volatile material was found to consist only of unreacted olefin, showing that there was no degradation of the gum to a volatile silicone. Those residues which contain silica, MgO, or KCl were strong elastomers and showed that from 30 to 40 percent by weight of the loaded styrene and about 50 percent of the loaded indene had been grafted onto the silicone polymer. Sample G, which was a "blank" containing only the gum and styrene, was a very weak material with very little rubbery properties, in which only 11 percent of the olefin had been grafted onto the polymer.

Example 11

A mixture of 100 parts by weight of a dimethylpolysiloxane gum, 20 parts styrene, and 35 parts "fume" silica having an average particle diameter of 0.012 micron, was thoroughly blended on a roll mill. A portion of the material was exposed to 4 mrep. from the 2 m.e.v. Van de Graaff generator, and another portion was exposed to 10 mrep. Both materials were devolatilized at a pressure of less than 1 mm. Hg for 52 hours, and both were found to be strong rubbery products. The 4 mrep. treated portion showed that 46 percent of the loaded styrene had been grafted to the silicone, and that treated with 10 mrep. showed 66 percent of the styrene had grafted.

Example 12

When the organosilicon-olefin-silica mixtures illustrated in Examples 8 and 9 (without the peroxides, etc., used in those examples) are exposed to a dosage of 2 to 4 mrep. from the 2 m.e.v. Van de Graaff generator, the corresponding graft polymers are obtained. Good results are also obtained when the silica is replaced by cyanite, beryl, olivine, silica-alumina gel, $BaCl_2$, NaF or $K_2Te$ in particle sizes of less than 5 microns.

That which is claimed is:

1. A process for producing graft polymers which comprises homogeneously dispersing and suspending a finely divided inorganic solid having an average particle size of from 0.005 to 5 microns in diameter throughout a mixture of (1) an organopolysiloxane having at least one alkyl radical attached to Si by Si—C linkage per molecule, said radical having less than 5 carbon atoms therein and said organopolysiloxane being essentially free of organic radicals having aliphatic unsaturation, and (2) an olefinic compound selected from the group consisting of (a) olefinic hydrocarbons, (b) halogenated olefinic hydrocarbons, (c) alkenyl alcohols, (d) alkenyl amines, (e) alkenyl nitriles, (f) alkenyl amides, (g) ethylenically unsaturated mono- and discarboxylic acids, (h) alkenyl esters of saturated mono- and dicarboxylic acids, and (i) alkyl esters of ethylenically unsaturated mono- and dicarboxylic acids, the compounds (g), (h) and (i) each consisting of carbon, hydrogen and carboxylic oxygen atoms, and then exposing the dispersion to the action of a free radical generator under conditions such that free radicals are generated, the aforesaid finely divided inorganic solid being selected from the group consisting of (A) silica, (B) silica-metal oxide mixed gels, (C) mineral silicats, (D) salides of Li, Na, K, Cs, Rb, Ba, Cd, Sr, Mg and Zn, (E) selenides, sulfides, and tellurides of K, Na, Li, Mg, Ca, Sr, and Ba, and (F) oxides of Mg, Ca, Sr, and Ba.

2. The process of claim 1 wherein the free radical generator is ionizing radiation of sufficient duration and intensity to provide from 0.1 to 10 megareps.

3. The process of claim 1 wherein the free radical generator is selected from the group consisting of organic peroxides and azo compounds in which both of the N atoms of the azo linkage are attached to a tertiary carbon atom and the remaining valences of said tertiary carbon atoms are satisfied by radicals of the group consisting of nitrile radicals, carboxyalkyl radicals, cycloalkylene radicals, alkyl radicals and radicals of the formula YOOC— in which Y is an alkyl radical.

4. A process for producing graft polymers which comprises homogeneously disbursing and suspending a finely divided silica having a particle size of from 0.005 to 5 microns in diameter throughout a mixture of a dimethylpolysiloxane and an olefinic compound selected from the group consisting of (a) olefinic hydrocarbons, (b) halogenated olefinic hydrocarbons, (c) alkenyl alcohols, (d) alkenyl amines, (e) alkenyl nitriles, (f) alkenyl amides, (g) ethylenically unsaturated mono- and dicarboxylic acids, (h) alkenyl esters of saturated mono- and dicarboxylic acids, and (i) alkyl esters of ethylenically unsaturated mono- and dicarboxylic acids, the compounds (g), (h) and (i) each consisting of carbon, hydrogen and carboxylic oxygen atoms, then exposing the dispersion to ionizing radiation of sufficient duration and intensity to provide from 0.1 to 10 megareps.

5. A process for producing graft polymers which comprises homogeneously disbursing and suspending a finely divided silica having an average particle size of from 0.005 to 5 microns in diameter throughout a mixture of a dimethylpolysiloxane and indene, and then exposing the dispersion to the action of a free radical generator under conditions such that free radicals are generated.

6. A process for producing graft polymers which comprises homogeneously disbursing and suspending a finely divided silica having an average particle size of from 0.005 to 5 microns in diameter throughout a mixture of a dimethylpolysiloxane and styrene, and then exposing the dispersion to the action of a free radical generator under conditions such that free radicals are generated.

7. A process for producing graft polymers which comprises homogeneously disbursing and suspending a finely divided silica having an average particle size of from 0.005 to 5 microns in diameter throughout a mixture of a dimethylpolysiloxane and acrylamide, and then exposing the dispersion to the action of a free radical generator under conditions such that free radicals are generated.

8. A process for producing graft polymers which comprises homogeneously disbursing and suspending a finely divided silica having an average particle size of from 0.005 to 5 microns in diameter throughout a mixture of dimethylpolysiloxane and acrylonitrile, and then exposing the dispersion to the action of a free radical generator under conditions such that free radicals are generated.

9. A process for producing graft polymers which comprises homogeneously dispersing and suspending a finely divided silica having an average particle size of from 0.005 to 5 microns in diameter throughout a mixture of a dimethylpolysiloxane and trifluorochloroethylene, and then exposing the dispersion to ionizing radiation of sufficient duration and intensity to provide from 0.1 to 10 megareps.

10. A process for producing graft polymers which comprises homogeneously dispersing and suspending a finely divided silica having an average particle size of from 0.005 to 5 microns in diameter throughout a mixture of (1) a dimethylpolysiloxane, (2) trifluorochloroethylene, and (3) a free radical generator selected from the group consisting of organic peroxides and azo compounds in which both of the N atoms of the azo linkage are attached to a tertiary carbon atom and the remaining valences of said tertiary carbon atoms are satisfied by radicals of the group consisting of nitrile radicals, carboxyalkyl radicals, cycloalkylene radicals, alkyl radicals and radicals of the formula YOOC— in which Y is an alkyl radical, and heating the dispersion at a temperature above that at which the free radical generator forms free radicals.

References Cited in the file of this patent

UNITED STATES PATENTS

| | | |
|---|---|---|
| 2,613,199 | DiGiorgio et al. | Oct. 7, 1952 |
| 2,716,128 | West | Aug. 23, 1955 |
| 2,763,609 | Lewis et al. | Sept. 18, 1956 |
| 2,766,220 | Kantor | Oct. 9, 1956 |
| 2,785,147 | Kantor | Mar. 12, 1957 |
| 2,819,236 | Dickmann | Jan. 7, 1958 |

OTHER REFERENCES

Chemical and Engineering News, vol. 33, No. 1, Jan. 3, 1955, page 17 (copy in Sci. Lib.).

UNITED STATES PATENT OFFICE
CERTIFICATION OF CORRECTION

Patent No. 2,959,569            November 8, 1960

Earl L. Warrick

It is hereby certified that error appears in the above numbered patent requiring correction and that the said Letters Patent should read as corrected below.

Column 3, line 28, for "(EtOOC)Me$_2$=NCMe$_2$(COOEt)" read -- (EtOOC)Me$_2$CN=NCMe$_2$(COOEt) --; column 4, line 4, for "menter" read -- center --; column 5, line 19, for "butadient" read -- butadiene --; column 12, line 20, for "silicats" read -- silicates --; same line 20, for "salides" read -- halides --.

Signed and sealed this 27th day of June 1961.

(SEAL)
Attest:

ERNEST W. SWIDER
Attesting Officer

DAVID L. LADD
Commissioner of Patents